United States Patent
Horikawa et al.

(10) Patent No.: US 12,392,676 B2
(45) Date of Patent: Aug. 19, 2025

(54) SEMICONDUCTOR PRESSURE SENSOR

(71) Applicant: Mitsubishi Electric Corporation, Tokyo (JP)

(72) Inventors: Yuki Horikawa, Tokyo (JP); Hirofumi Konishi, Tokyo (JP); Fusako Tanabe, Tokyo (JP); Mayumi Fujiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 241 days.

(21) Appl. No.: 18/191,533

(22) Filed: Mar. 28, 2023

(65) Prior Publication Data

US 2023/0341281 A1    Oct. 26, 2023

(30) Foreign Application Priority Data

Apr. 25, 2022    (JP) .................................. 2022-071678

(51) Int. Cl.
*G01L 9/06*    (2006.01)
*G01L 9/00*    (2006.01)

(52) U.S. Cl.
CPC .................. *G01L 9/0052* (2013.01)

(58) Field of Classification Search
CPC .......... G01L 9/00–06; G01L 9/0052
See application file for complete search history.

(56) References Cited

U.S. PATENT DOCUMENTS

| 9,459,172 | B2 * | 10/2016 | Chen .................. G01L 9/0055 |
| 2017/0003187 | A1 | 1/2017 | Lim et al. |
| 2017/0113917 | A1 * | 4/2017 | Yoshikawa .......... G01L 9/0048 |
| 2022/0316972 | A1 * | 10/2022 | Umano ................ G01L 9/0052 |

FOREIGN PATENT DOCUMENTS

| JP | 2009-139258 A | 6/2009 |
| JP | 2017-83187 A | 5/2017 |
| JP | 6218330 B2 | 10/2017 |
| JP | 6300773 B2 | 3/2018 |

OTHER PUBLICATIONS

Office Action issued May 9, 2023 in Japanese Application No. 2022-071678.

\* cited by examiner

*Primary Examiner* — Nguyen Q. Ha
(74) *Attorney, Agent, or Firm* — Sughrue Mion, PLLC

(57) ABSTRACT

A semiconductor pressure sensor includes a first silicon substrate and a second silicon substrate. One main surface of the second silicon substrate has a recess formed therein. The recess has a support that protrudes toward the first silicon substrate formed therein. The support includes four side parts that are arranged to form a rectangular frame shape. The recess and the first silicon substrate have an inner cavity and an outer cavity that are formed therebetween. The inner cavity is arranged on an inner side of the support, and the outer cavity is arranged on an outer side of the support. The other main surface of the first silicon substrate has piezoresistive elements formed therein. The piezoresistive elements are arranged at or in the vicinity of a position overlapping the support, as seen from a normal direction of the first silicon substrate.

10 Claims, 7 Drawing Sheets

SEMICONDUCTOR PRESSURE SENSOR

BACKGROUND OF THE INVENTION

Field of the Invention

This disclosure relates to a semiconductor pressure sensor.

Description of the Related Art

In Patent Literature 1, a semiconductor pressure sensor is described. This semiconductor pressure sensor includes a silicon substrate. A front surface of the silicon substrate has a plurality of piezoresistors formed therein. A back surface of the silicon substrate has a recess formed therein. A thin part of the silicon substrate functions as a diaphragm. At least some of the piezoresistors are formed on the diaphragm.

CITATION LIST

Patent Literature

Patent Literature 1: JP 2009-139258 A

Each of a step of forming a piezoresistive element and a step of forming a diaphragm involves an exposure process. Accordingly, relative position deviation between the piezoresistive element and the diaphragm may be generated due to alignment accuracy of the exposure process in each step. As a result, there is a problem in that an output voltage relative to pressure tends to vary.

SUMMARY OF THE INVENTION

This disclosure has been made in order to solve the above-mentioned problem, and an object of this disclosure is to provide a semiconductor pressure sensor with which it is possible to reduce variations in output voltage relative to pressure.

According to at least one embodiment of this disclosure, there is provided a semiconductor pressure sensor including: a first silicon substrate; and a second silicon substrate, one main surface of the first silicon substrate and one main surface of the second silicon substrate being joined to each other, the one main surface of the second silicon substrate having a recess formed therein, the first silicon substrate including a diaphragm that faces the recess, the recess having a support that protrudes toward the first silicon substrate formed therein, the support including four side parts that are arranged to form a rectangular frame shape, the support including a protrusion end surface that is joined to the one main surface of the first silicon substrate, the recess and the first silicon substrate having an inner cavity and an outer cavity that are formed therebetween, the inner cavity being arranged on an inner side of the support, the outer cavity being arranged on an outer side of the support, the other main surface of the first silicon substrate having piezoresistive elements formed therein, the piezoresistive elements being arranged at or in a vicinity of a position overlapping the support, as seen from a normal direction of the first silicon substrate.

According to the at least one embodiment of this disclosure, it is possible to reduce variations in output voltage relative to pressure.

DESCRIPTION OF THE EMBODIMENTS

First Embodiment

Figure 1:
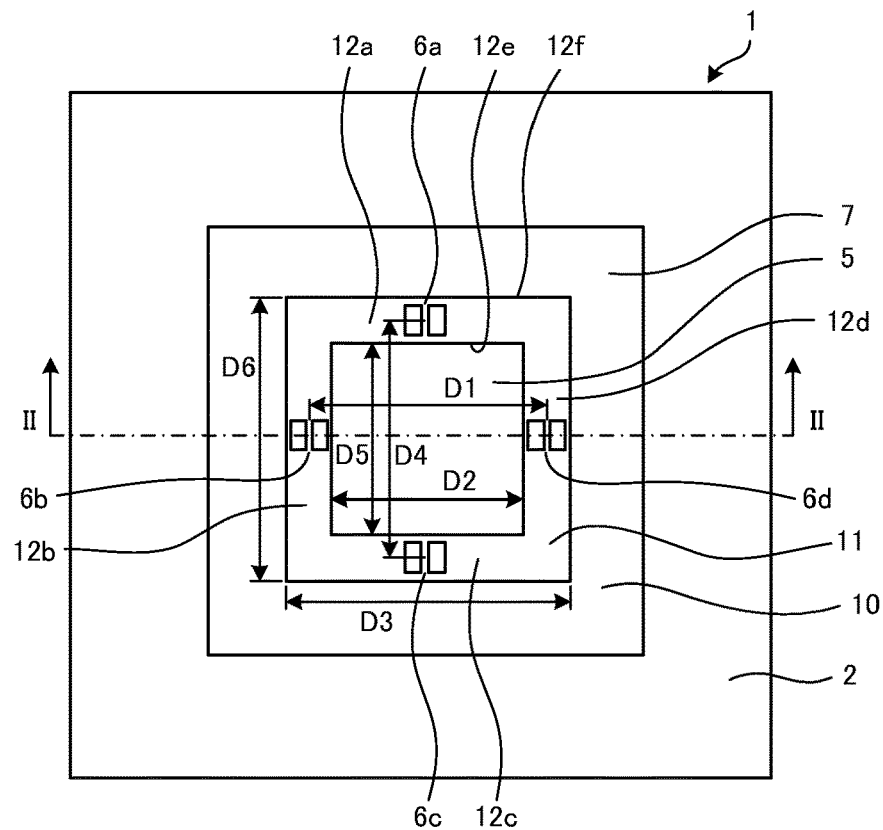
FIG. 1 is a plan view for illustrating a configuration of a semiconductor pressure sensor according to a first embodiment of this disclosure.
Figure 2:
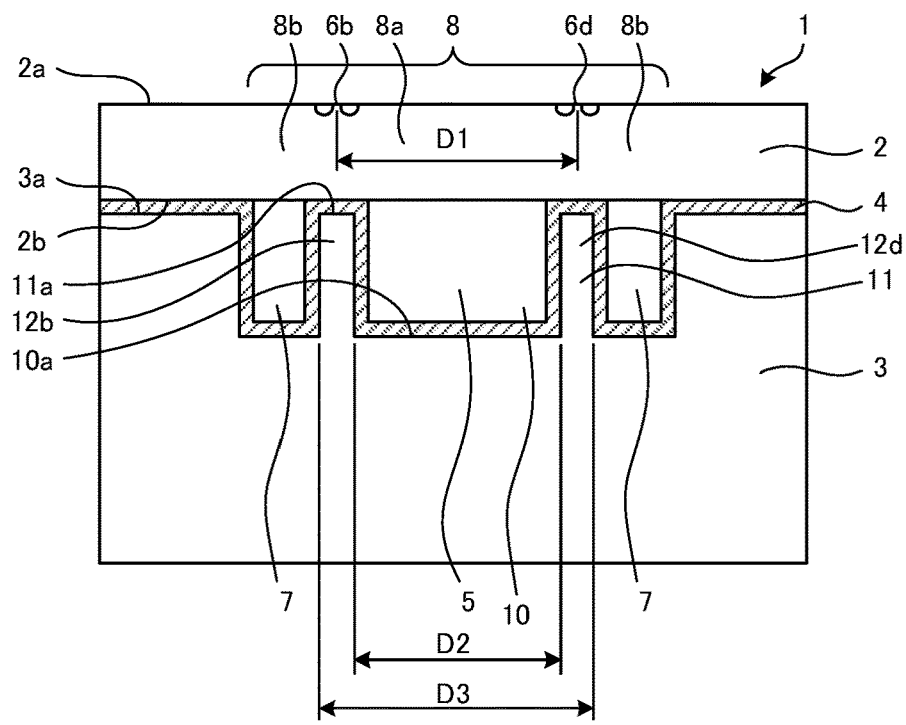
FIG. 2 is a schematic view for illustrating a cross section taken along the line II-II of FIG. 1.

A semiconductor pressure sensor according to a first embodiment of this disclosure is described. FIG. 1 is a plan view for illustrating a configuration of the semiconductor pressure sensor according to this embodiment. FIG. 2 is a schematic view for illustrating a cross section taken along the line II-II of FIG. 1. An up-and-down direction of FIG. 2 is a thickness direction of each of a first silicon substrate 2 and a second silicon substrate 3, which is a normal direction of each of the first silicon substrate 2 and the second silicon substrate 3.

As illustrated in FIG. 1 and FIG. 2, a semiconductor pressure sensor 1 includes the first silicon substrate 2 and the second silicon substrate 3. One main surface 2b of the first silicon substrate 2 and one main surface 3a of the second silicon substrate 3 face each other. The main surface 2b of the first silicon substrate 2 and the main surface 3a of the second silicon substrate 3 are joined to each other.

The other main surface 2a of the first silicon substrate 2 has a plurality of piezoresistive elements 6a, 6b, 6c, and 6d formed therein. The main surface 2a is a surface that receives pressure of a detection target. The first silicon substrate 2 is formed of a single-crystal silicon substrate. The first silicon substrate 2 has a thickness smaller than that of the second silicon substrate 3. The piezoresistive elements 6a, 6b, 6c, and 6d have the same characteristics.

The second silicon substrate 3 is formed of a single-crystal silicon substrate. The main surface 3a of the second silicon substrate 3 has a recess 10 formed therein. The recess 10 is formed into a rectangular shape in plan view as seen from the normal direction of the first silicon substrate 2. The recess 10 is formed by anisotropic etching in the thickness direction of the second silicon substrate 3 from the main surface 3a. Thus, the recess 10 has a rectangular cross section.

A rectangular frame-shaped support 11 is formed in the recess 10. The support 11 protrudes from a bottom surface 10a of the recess 10 toward the first silicon substrate 2. The support 11 is formed simultaneously with the recess 10 by anisotropic etching. Thus, the support 11 has a rectangular cross section. The support 11 has a protrusion end surface 11a at a top end in its protruding direction. The protrusion end surface 11a is joined to the main surface 2b of the first silicon substrate 2, along the entire circumference.

The support 11 has a first side part 12a, a second side part 12b, a third side part 12c, and a fourth side part 12d. The first side part 12a, the second side part 12b, the third side part 12c, and the fourth side part 12d are arranged to form a rectangular frame shape. Each of the first side part 12a, the second side part 12b, the third side part 12c, and the fourth side part 12d is formed into a straight line shape in plan view. The first side part 12a and the third side part 12c face each other. The first side part 12a and the third side part 12c extend in a lateral direction of FIG. 1. The first side part 12a and the third side part 12c have the same width.

The second side part 12b and the fourth side part 12d face each other. The second side part 12b and the fourth side part 12d extend in a longitudinal direction of FIG. 1. The extending direction of the first side part 12a and the third side part 12c and the extending direction of the second side part 12b and the fourth side part 12d are orthogonal to each other. The second side part 12b and the fourth side part 12d have the same width. The first side part 12a, the second side part 12b, the third side part 12c, and the fourth side part 12d are formed so as to have a square shape in plan view.

The main surface 3a of the second silicon substrate 3 has a silicon oxide film 4 formed thereon. The main surface 2b of the first silicon substrate 2 and the main surface 3a of the second silicon substrate 3 are joined to each other via the silicon oxide film 4. The silicon oxide film 4 is formed also on the bottom surface 10a of the recess 10 and the protrusion end surface 11a of the support 11. The protrusion end surface 11a of the support 11 and the main surface 2b of the first silicon substrate 2 are joined to each other via the silicon oxide film 4.

A space is formed between the recess 10 and the first silicon substrate 2. This space is partitioned into an inner cavity 5 and an outer cavity 7 by the support 11. The inner cavity 5 is formed on an inner inside of the support 11. The inner cavity 5 is positioned at the center of the recess 10 in plan view.

The outer cavity 7 is formed on an outer side of the support 11. The outer cavity 7 is positioned at an outer periphery of the recess 10 in plan view. The outer cavity 7 is arranged so as to enclose the inner cavity 5. Each of the inner cavity 5 and the outer cavity 7 is maintained in a state of vacuum that has a pressure lower than the atmospheric pressure. The pressure in the inner cavity 5 and the pressure in the outer cavity 7 are equal to each other.

The first silicon substrate 2 includes a diaphragm 8. The diaphragm 8 is a part of the first silicon substrate 2 and faces the recess 10 of the second silicon substrate 3. The diaphragm 8 is a pressure receiving part that deforms in accordance with pressure of a detection target. Strain is generated in the diaphragm 8 in response to an applied pressure. The degree of strain, that is, pressure sensitivity, is determined depending on dimensions and thickness of the diaphragm 8. In the configuration of this embodiment, the thickness of the diaphragm 8 corresponds to the thickness of the first silicon substrate 2. The piezoresistive elements 6a, 6b, 6c, and 6d are formed on the diaphragm 8.

Each of the first side part 12a, the second side part 12b, the third side part 12c, and the fourth side part 12d has an inner wall surface 12e and an outer wall surface 12f. The inner wall surface 12e faces the inner cavity 5. The outer wall surface 12f faces the outer cavity 7.

The piezoresistive elements 6b and 6d face each other. The piezoresistive elements 6b and 6d are arranged in parallel along a direction in which the second side part 12b and the fourth side part 12d face each other. The distance between centers of the piezoresistive elements 6b and 6d is D1. The distance between the inner wall surfaces 12e of the second side part 12b and the fourth side part 12d is D2. The distance between the outer wall surfaces 12f of the second side part 12b and the fourth side part 12d is D3. Under these conditions, the distances D1, D2, and D3 satisfy a relationship of "D2≤D1≤D3."

In this embodiment, the distance D1 is equal to a distance ((D2+D3)/2) between centers in the width direction of the second side part 12b and the fourth side part 12d. That is, the distances D1, D2, and D3 satisfy a relationship of "D1=(D2+D3)/2."

The piezoresistive elements 6a and 6c face each other. The piezoresistive elements 6a and 6c are arranged in parallel along a direction in which the first side part 12a and the third side part 12c face each other. The distance between centers of the piezoresistive elements 6a and 6c is D4. The distance between the inner wall surfaces 12e of the first side part 12a and the third side part 12c is D5. The distance between the outer wall surfaces 12f of the first side part 12a and the third side part 12c is D6. Under these conditions, the distances D4, D5, and D6 satisfy a relationship of "D5≤D4≤D6."

In this embodiment, the distance D4 is equal to a distance ((D5+D6)/2) between centers in the width direction of the first side part 12a and the third side part 12c. That is, the distances D4, D5, and D6 satisfy a relationship of "D4=(D5+D6)/2."

Each of the piezoresistive elements 6a, 6b, 6c, and 6d is arranged on the diaphragm 8 in the vicinity of a region joined to the support 11. That is, each of the piezoresistive elements 6a, 6b, 6c, and 6d is arranged at or in the vicinity of a position overlapping the support 11, as seen from the normal direction of the first silicon substrate 2. The piezoresistive element 6a is arranged at or in the vicinity of a position overlapping the first side part 12a. The piezoresistive element 6b is arranged at or in the vicinity of a position overlapping the second side part 12b. The piezoresistive element 6c is arranged at or in the vicinity of a position overlapping the third side part 12c. The piezoresistive element 6d is arranged at or in the vicinity of a position overlapping the fourth side part 12d.

The diaphragm 8 includes a first diaphragm 8a and a second diaphragm 8b. The first diaphragm 8a is a part facing the inner cavity 5 of the diaphragm 8. The second diaphragm 8b is a part facing the outer cavity 7 of the diaphragm 8.

In the configuration described above, when a pressure of a detection target is applied to the main surface 2a of the first silicon substrate 2, strain is generated in the first diaphragm 8a in accordance with a pressure difference between the pressure of the detection target and the pressure in the inner cavity 5. Meanwhile, strain is generated in the second diaphragm 8b in accordance with a pressure difference between the pressure of the detection target and the pressure in the outer cavity 7. When strain is generated in each of the first diaphragm 8a and the second diaphragm 8b, strain is generated also in each of the regions in which the piezoresistive elements 6a, 6b, 6c, and 6d are formed. The resistance value of each of the piezoresistive elements 6a, 6b, 6c, and 6d varies in response to the strain generated in the corresponding region. The resistance values of the piezoresistive elements 6a, 6b, 6c, and 6d are output after being converted into an electric signal. The output electric signal is extracted to the outside from a metal electrode pad via a diffusion wiring layer and metal wiring.

Figure 3:
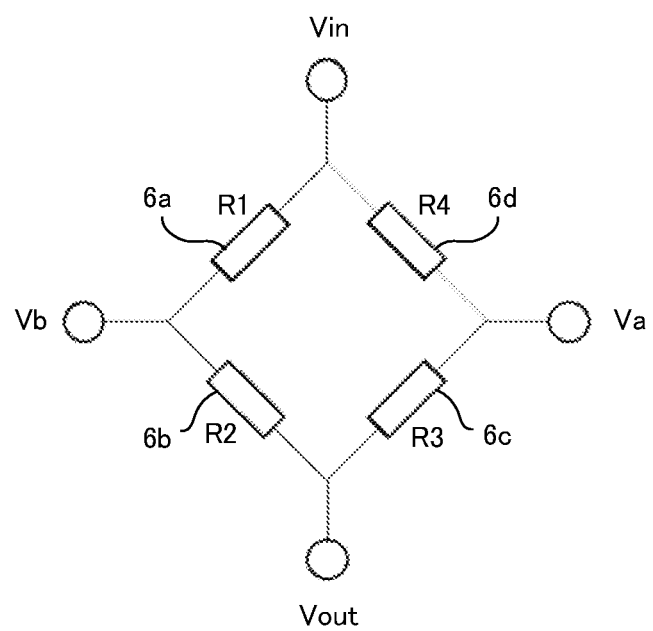
FIG. 3 is a diagram for illustrating a main part of an electric circuit of the semiconductor pressure sensor according to the first embodiment.

FIG. 3 is a diagram for illustrating a main part of an electric circuit of the semiconductor pressure sensor according to this embodiment. As illustrated in FIG. 3, the piezoresistive elements 6a, 6b, 6c, and 6d are connected so as to form a Wheatstone bridge. The piezoresistive element 6a has a resistance value of R1. The piezoresistive element 6b has a resistance value of R2. The piezoresistive element 6c has a resistance value of R3. The piezoresistive element 6d has a resistance value of R4.

The relationship between the resistance value of each piezoresistive element and a strain amount of the diaphragm is represented by Expression (1), where a resistance value is "R," a strain amount is "ε," an amount of change in the resistance value due to strain is "ΔR," and a gauge factor of the piezoresistive element is "Ks." The gauge factor is a constant that is determined by the material of the piezoresistive element.

$$\Delta R/R = K_s \cdot \varepsilon \quad (1)$$

The piezoresistive elements 6a and 6c are arranged at positions so as to be symmetric to each other. The piezoresistive elements 6b and 6d are arranged at positions so as to be symmetric to each other. Assuming that an amount of change in the resistance value R1 and an amount of change in the resistance value R3 are equal to each other, an amount of change in the resistance value R2 and an amount of change in the resistance value R4 are equal to each other, and a voltage that is input to the Wheatstone bridge is "Vin," an output voltage Vout between Vb and Va is represented by Expression (2).

$$V_{out} = (R1 \cdot R3 - R2 \cdot R4)/((R1+R2)(R3+R4)) \cdot V_{in} \quad (2)$$

When the resistance values R1, R2, R3, and R4 are the same, Vout=0. When the balance is lost due to change in each resistance value, Vout≠0. Assuming that all of the piezoresistive elements 6a, 6b, 6c, and 6d use strain gauges, and the gauge factors of the piezoresistive elements 6a, 6b, 6c, and 6d are the same, the output voltage Vout is represented by Expression (3).

$$V_{out} = K_s/4 \cdot (\varepsilon 1 - \varepsilon 2 + \varepsilon 3 - \varepsilon 4) \cdot V_{in} \quad (3)$$

Figure 4:
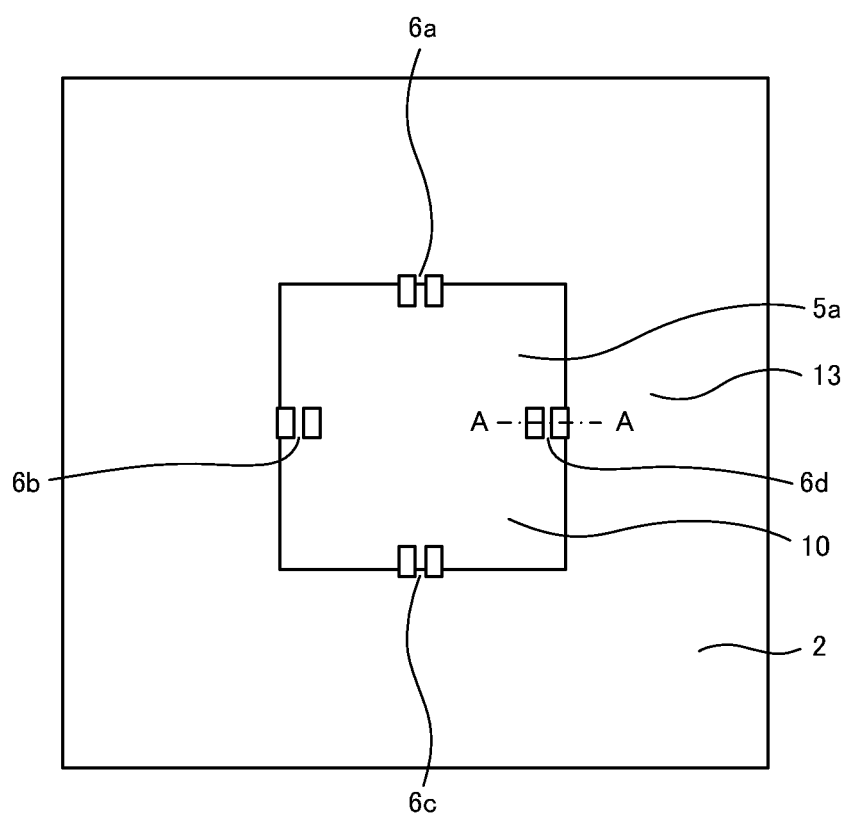
FIG. 4 is a plan view for illustrating a configuration of a semiconductor pressure sensor in a comparative example of the first embodiment.

FIG. 4 is a plan view for illustrating a configuration of a semiconductor pressure sensor in a comparative example of this embodiment. As illustrated in FIG. 4, a cavity 5a is formed in the recess 10 in this comparative example. A frame-shaped support 11 is not formed in the recess 10. A support 13 is formed on the outer side of the recess 10.

Figure 5:
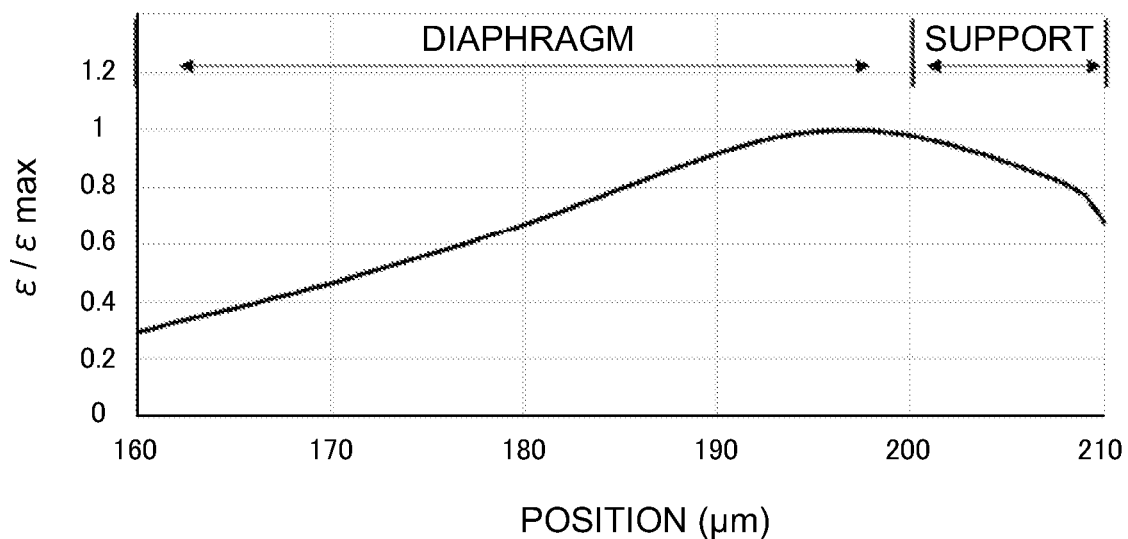
FIG. 5 is a graph for showing a distribution of relative strain that is generated in a first silicon substrate on the line A-A of FIG. 4.

FIG. 5 is a graph for showing a distribution of relative strain that is generated in a first silicon substrate on the line A-A of FIG. 4. The horizontal axis represents a position. The position is represented by a distance (μm) from the center of the cavity 5a. The range of 200 μm or less in the horizontal axis represents a region of a diaphragm. The vertical axis represents a relative strain (ε/εmax). The relative strain is a value of a strain amount relative to a maximum strain amount that is assumed as 1, to thereby make the strain amount dimensionless.

As shown in FIG. 5, a relative strain that is generated in the first silicon substrate is maximum at an outer peripheral end of the diaphragm. The relative strain decreases as the position is more separated inward from the outer peripheral end of the diaphragm, and the relative strain also decreases as the position is more separated outward from the outer peripheral end of the diaphragm. The relative strain at a position separated outward from the outer peripheral end of the diaphragm by 10 μm is approximately 0.65. A reference position of each piezoresistive element is set to a position at which the relative strain is maximum. The reference position is a target position in design. The position at which the relative strain is maximum is determined by the position in the diaphragm. Thus, the reference position of each piezoresistive element is determined relative to the position in the diaphragm.

Each of the step of forming the piezoresistive elements 6a, 6b, 6c, and 6d and the step of forming the recess 10 involves an exposure process. Due to alignment accuracy of each exposure process, the position of the piezoresistive elements 6a, 6b, 6c, and 6d may be deviated relative to the diaphragm. The position deviation that is generated in the piezoresistive elements 6a, 6b, 6c, and 6d results in deviation of actual positions at which the piezoresistive elements 6a, 6b, 6c, and 6d are formed, from the reference positions.

In a case in which each of the piezoresistive elements 6a, 6b, 6c, and 6d is formed at a position deviated from the reference position by 5 μm in a lateral direction of FIG. 4, the output voltage is decreased by 1.2%, in accordance with Expression (3). Similarly, in a case in which each of the piezoresistive elements 6a, 6b, 6c, and 6d is formed at a position deviated by 5 μm in a longitudinal direction of FIG. 4, the output voltage is decreased by 1.2%. In a case in which each of the piezoresistive elements 6a, 6b, 6c, and 6d is formed at a position deviated by 5 μm in an oblique direction of FIG. 4, the output voltage is decreased by 2.3%.

The output voltage varies in accordance with position deviation of the piezoresistive elements 6a, 6b, 6c, and 6d because an amount of strain that is generated in the diaphragm differs depending on positions. In the configuration of the comparative example, strain concentrates on the outer peripheral end of the diaphragm. Thus, deviation from the reference position of each of the piezoresistive elements 6a, 6b, 6c, and 6d greatly varies the strain amount. In order to reduce variations in the strain amount even when the positions of the piezoresistive elements are deviated, it is effective to generate a uniform strain by enlarging a region on which strain concentrates.

Figure 6:
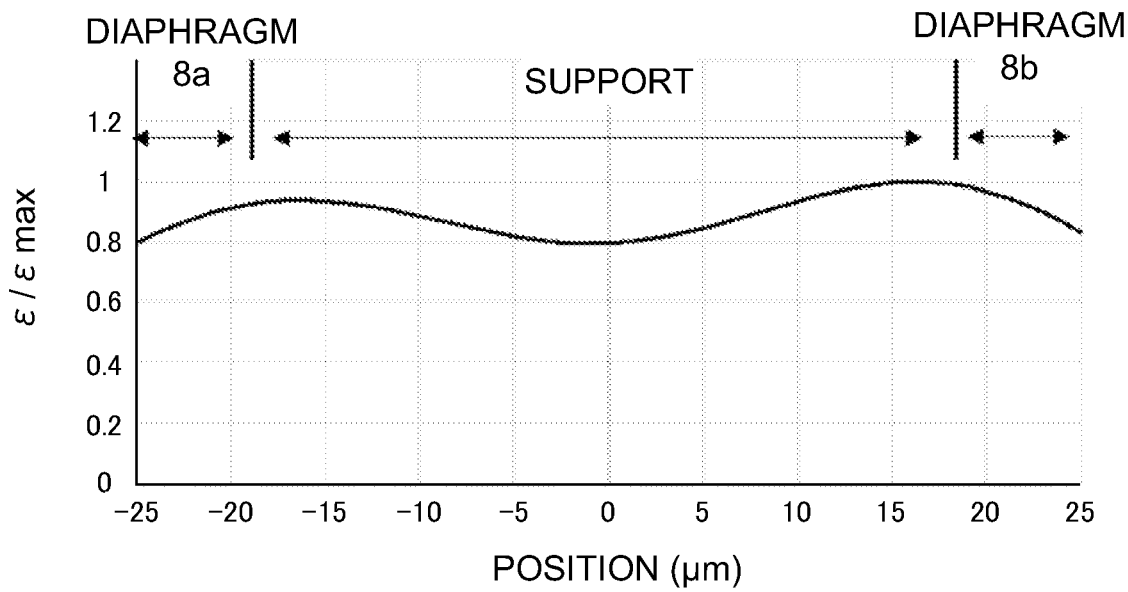
FIG. 6 is a graph for showing a distribution of relative strain that is generated in a diaphragm of the semiconductor pressure sensor according to the first embodiment.

FIG. 6 is a graph for showing a distribution of relative strain that is generated in the diaphragm of the semiconductor pressure sensor according to this embodiment. FIG. 6 shows a strain distribution of the diaphragm 8 in the width direction of one of the side parts 12a, 12b, 12c, and 12d of the support 11. The horizontal axis represents a position. The position is represented by a distance (μm) from the center in the width direction of a side part, assuming that a direction toward the outside of the support 11 is a positive direction. The vertical axis represents a relative strain (ε/εmax). The main surface 2a of the first silicon substrate 2 is applied with a pressure.

Herein, each of the longitudinal width and the lateral width of the inner cavity 5 is 200 μm, and the width of the outer cavity 7 is 150 μm. The width of the support 11, that is, the width of each side part of the support 11 is 36 μm. In the horizontal axis of FIG. 6, a range of −18 μm or more and 18 μm or less is a region that overlaps the support 11. A range of less than −18 μm is a region of the first diaphragm 8a. A range of more than 18 μm is a region of the second diaphragm 8b. As shown in FIG. 6, a region on which strain concentrates is formed at both of an inner side and an outer side of the center in the width direction of the side part of the support 11. A uniform strain is generated in the diaphragm 8 in the vicinity of a region joined to the support 11. The relative strain is 0.8 or higher in the whole region of the range of ±20 μm centering at the center in the width direction of the side part.

The reference position of each of the piezoresistive elements 6a, 6b, 6c, and 6d is set to the center in the width direction and the extending direction of the corresponding side part of the support 11. In a case in which each of the piezoresistive elements 6a, 6b, 6c, and 6d is arranged at a position deviated from the reference position by 5 μm in the lateral direction of FIG. 1, the output voltage is increased by 1.0%, in accordance with Expression (3). In a case in which each of the piezoresistive elements 6a, 6b, 6c, and 6d is arranged at a position deviated from the reference position by 5 μm in the longitudinal direction of FIG. 1, the output voltage is increased by 0.4%. In a case in which each of the piezoresistive elements 6a, 6b, 6c, and 6d is arranged at a position deviated from the reference position by 5 μm in the oblique direction of FIG. 1, the output voltage is increased by 1.4%.

In this embodiment, variations in strain around each of the reference positions of the piezoresistive elements 6a, 6b, 6c, and 6d are smaller than those in the comparative example. Thus, it is possible to reduce variations in the output voltage relative to pressure even when the position of each of the piezoresistive elements 6a, 6b, 6c, and 6d is deviated.

In this embodiment, the rectangular frame-shaped support 11 is formed in the recess 10, and hence the degree of the whole strain is smaller than that in the comparative example. In order to increase an S/N ratio by increasing strain, it is effective to make the diaphragm 8 thin or widen the widths of the first diaphragm 8a and the second diaphragm 8b.

Figure 7:
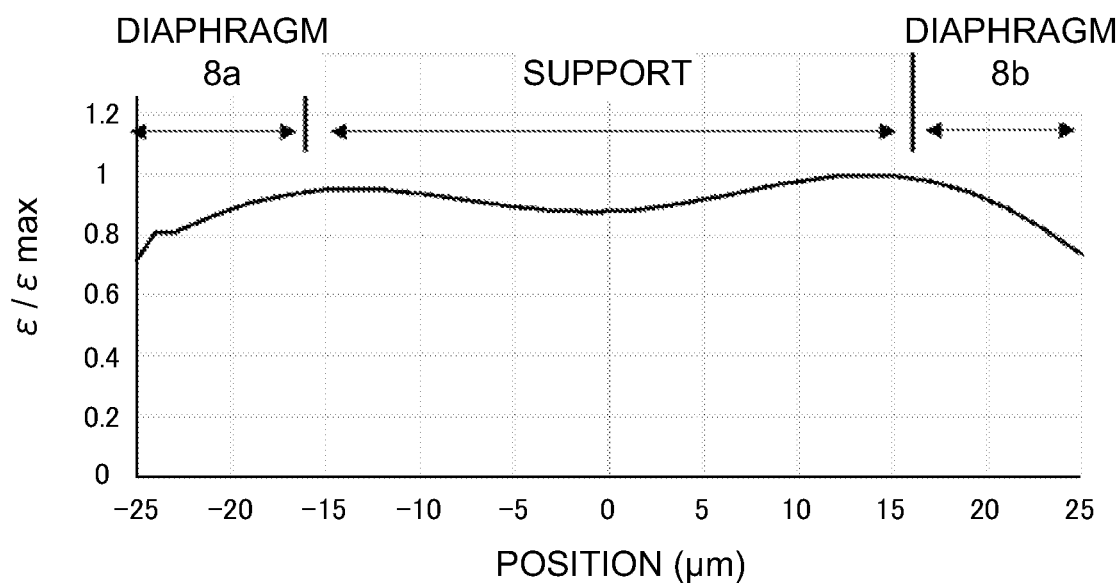
FIG. 7 is a graph for showing another example of the distribution of relative strain that is generated in the diaphragm of the semiconductor pressure sensor according to the first embodiment.

FIG. 7 is a graph for showing another example of the distribution of relative strain that is generated in the diaphragm of the semiconductor pressure sensor according to this embodiment. FIG. 7 shows a strain distribution in a case of using a support 11 having a width of 32 μm. The horizontal axis and the vertical axis of FIG. 7 are the same as those of FIG. 6. In the horizontal axis of FIG. 7, a range of −16 μm or more and 16 μm or less is a region that overlaps the support 11. A range of less than −16 μm is a region of the first diaphragm 8a. A range of more than 16 μm is a region of the second diaphragm 8b.

As shown in FIG. 7, strain that is generated on the inner side of the center in the width direction of the side part and strain that is generated on the outer side of the center in the width direction of the side part overlap each other above the support 11. That is, a strain distribution having a peak on the inner side of the center in the width direction of the side part and a strain distribution having a peak on the outer side of the center in the width direction of the side part overlap each other above the support 11.

The relative strain at the center in the width direction of the side part is approximately 0.8 in the graph of FIG. 6, whereas the relative strain at the center in the width direction of the side part is increased to approximately 0.9 in the graph of FIG. 7. In this manner, when the width of the side part of the support 11 is narrowed, the strain that is generated on the inner side of the center in the width direction of the side part and the strain that is generated on the outer side of the center in the width direction of the side part overlap each other. Thus, uniformity of the strain in the vicinity of the region joined to the support 11 is further improved. The relative strain is 0.85 or higher in the whole region of the range of ±20 μm centering at the center in the width direction of the side part.

The reference position of each of the piezoresistive elements 6a, 6b, 6c, and 6d is set to the center in the width direction and the extending direction of the corresponding side part of the support 11. In the case in which each of the piezoresistive elements 6a, 6b, 6c, and 6d is arranged at a position deviated from the reference position by 5 μm in the lateral direction of FIG. 1, a change rate of the output voltage is 0.4%. In the case in which each of the piezoresistive elements 6a, 6b, 6c, and 6d is arranged at a position deviated from the reference position by 5 μm in the longitudinal direction of FIG. 1, the change rate of the output voltage is 0%. In the case in which each of the piezoresistive elements 6a, 6b, 6c, and 6d is arranged at a position deviated from the reference position by 5 μm in the oblique direction of FIG. 1, the change rate of the output voltage is 0.4%. It can be understood from this that it is possible to further reduce variations in the output voltage due to position deviation of the piezoresistive elements.

In order to further improve uniformity of the strain in the vicinity of the region joined to the support 11, it is preferred that, in the vicinity of the center in the width direction of the side part, the degree of strain that is generated on the outer side of the center and the degree of strain that is generated on the inner side of the center be equal to each other. In order to achieve such a strain distribution, it is required to appropriately design a relationship between the widths of the outer cavity 7 and the inner cavity 5.

For example, in FIG. 7, the peak of the relative strain on the second diaphragm 8b side is 1, whereas the peak of the relative strain on the first diaphragm 8a side is approximately 0.95. That is, the peak of strain that is generated on the outer side of the center in the width direction of the side part is greater than the peak of strain that is generated on the inner side of the center. In this case, it is effective to increase the width of the inner cavity 5 or decrease the width of the outer cavity 7. This enables the peak of strain that is generated on the outer side of the center and the peak of strain that is generated on the inner side of the center to be equal to each other, in the vicinity of the center in the width direction of the side part.

In this embodiment, the reference position of each of the piezoresistive elements 6a, 6b, 6c, and 6d is desirably set to the center in the width direction and the extending direction of the corresponding side part of the support 11. With this configuration, it possible to reduce the change rate of the output voltage even in the case in which the position of each of the piezoresistive elements 6a, 6b, 6c, and 6d is deviated from the reference position in an up-and-down direction or a right-and-left direction of FIG. 1.

The width of each side part of the support 11 is desirably equal to or greater than the sum of the dimension of the corresponding piezoresistive element 6a, 6b, 6c, or 6d and a positional tolerance of the corresponding piezoresistive element 6a, 6b, 6c, or 6d. With this configuration, each of the piezoresistive elements 6a, 6b, 6c, and 6d can be reliably formed in the region above the support 11, thereby being capable of further reducing variations in the output voltage due to position deviation.

Figure 8:
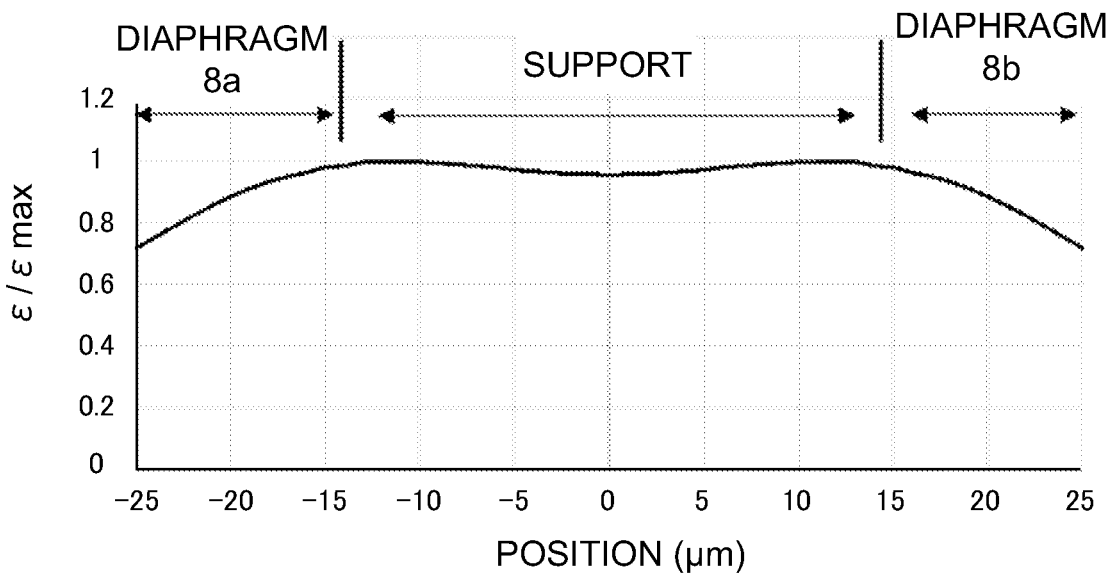
FIG. 8 is a graph for showing yet another example of the distribution of relative strain that is generated in the diaphragm of the semiconductor pressure sensor according to the first embodiment.

FIG. 8 is a graph for showing yet another example of the distribution of relative strain that is generated in the diaphragm of the semiconductor pressure sensor according to this embodiment. FIG. 8 shows a strain distribution in a case of using a support 11 having a width of 29 µm. The horizontal axis and the vertical axis of FIG. 8 are the same as those of FIG. 6. In the horizontal axis of FIG. 8, a range of −14.5 µm or more and 14.5 µm or less is a region that overlaps the support 11. A range of less than −14.5 µm is a region of the first diaphragm 8a. A range of more than 14.5 µm is a region of the second diaphragm 8b.

As shown in FIG. 8, the relative strain is 0.95 or higher in the whole region above the support 11. That is, in the case of the support 11 having a width of 29 µm, strain is approximately constant and is uniform in the region above the support 11. In this embodiment, the uniformity of strain is highest in the case in which the support 11 has a width of 29 µm. The relative strain is 0.85 or higher in the whole region of the range of ±20 µm centering at the center in the width direction of the side part.

Under the condition that the width of the support 11 is 29 µm, and the positional tolerance of each of the piezoresistive elements 6a, 6b, 6c, and 6d is ±5 µm, when each of the piezoresistive elements 6a, 6b, 6c, and 6d has a dimension of 19 µm or less, each of the piezoresistive elements 6a, 6b, 6c, and 6d can be reliably arranged in the region above the support 11 even when the positions of the piezoresistive elements 6a, 6b, 6c, and 6d are deviated. Thus, variations in the output voltage can be further reduced.

Figure 9:
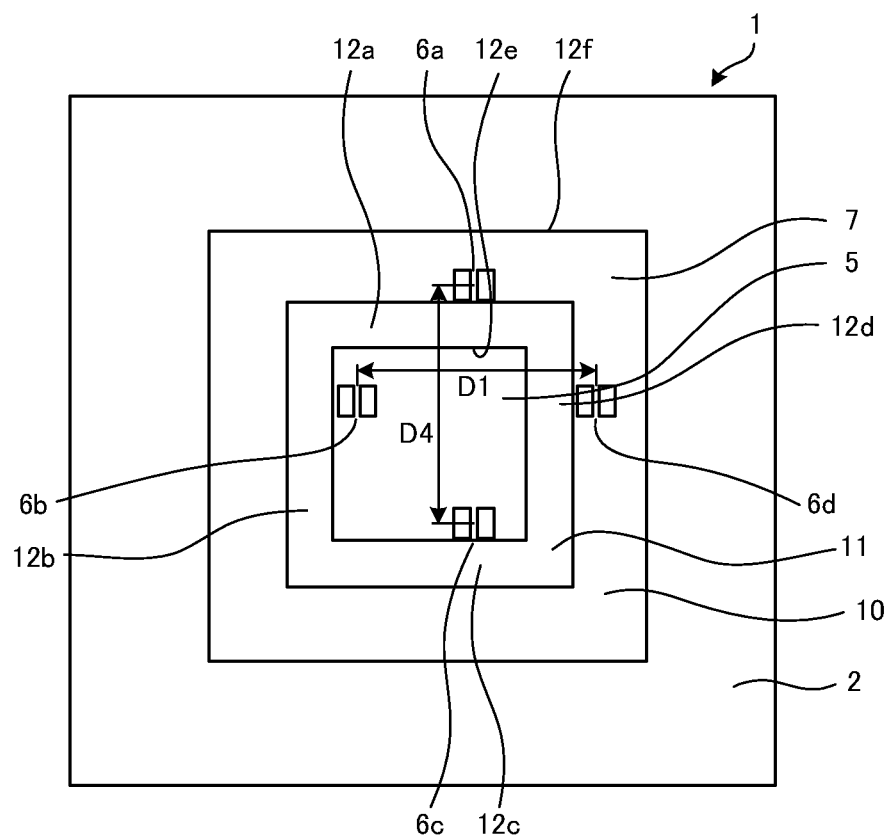
FIG. 9 is a plan view for illustrating a configuration of the semiconductor pressure sensor when the positions of piezoresistive elements are deviated in the first embodiment.

FIG. 9 is a plan view for illustrating a configuration of a semiconductor pressure sensor when the positions of piezoresistive elements are deviated in this embodiment. As illustrated in FIG. 9, the positions of the piezoresistive elements 6a, 6b, 6c, and 6d are deviated relative to the position of the diaphragm. Each of the piezoresistive elements 6a, 6b, 6c, and 6d does not overlap the support 11 as seen from the normal direction of the first silicon substrate 2. Nevertheless, each of the piezoresistive elements 6a, 6b, 6c, and 6d is arranged in the vicinity of the region joined to the support 11. Thus, in this embodiment, with the provision of the support 11, variations in the output voltage can be reduced even when the positions of piezoresistive elements 6a, 6b, 6c, and 6d are deviated as illustrated in FIG. 9.

In the step of forming the piezoresistive elements, the positions of the piezoresistive elements 6a, 6b, 6c, and 6d are determined simultaneously in the same exposure process. For this reason, even when the positions of the piezoresistive elements 6a, 6b, 6c, and 6d are deviated relative to the position of the diaphragm, relative positional relationships among the piezoresistive elements 6a, 6b, 6c, and 6d are maintained. Thus, the distance D1 of FIG. 9 is the same as the distance D1 of FIG. 1, and the distance D4 of FIG. 9 is the same as the distance D4 of FIG. 1.

Each of the piezoresistive elements 6a, 6b, 6c, and 6d may be composed of one element, or may be composed of a plurality of elements that are arranged in series or parallel. In addition, the piezoresistive elements 6a, 6b, 6c, and 6d may have mutually different shapes. It is preferred that the shape of each of the piezoresistive elements 6a, 6b, 6c, and 6d be appropriately designed.

Figure 10:
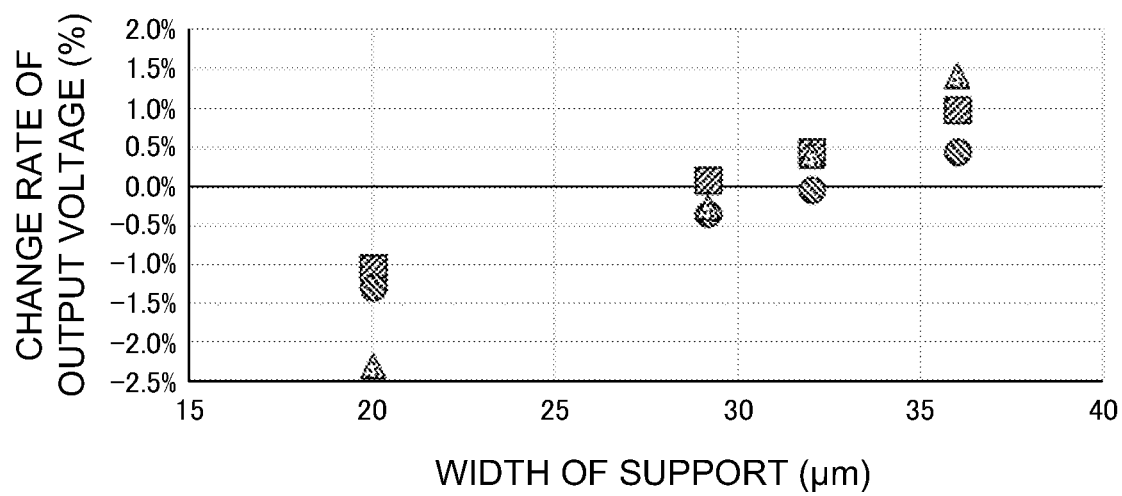
FIG. 10 is a graph for showing a relationship between a width of a support and a change rate of an output voltage in the semiconductor pressure sensor according to the first embodiment.

FIG. 10 is a graph for showing a relationship between the width of the support and a change rate of the output voltage in the semiconductor pressure sensor according to this embodiment. The horizontal axis represents a width (µm) of each of the side parts 12a, 12b, 12c, and 12d of the support 11. The vertical axis represents a change rate of the output voltage (%). The square marks in the graph each represent a change rate of the output voltage in the case in which the position of each of the piezoresistive elements 6a, 6b, 6c, and 6d is deviated from the reference position by 5 µm in the lateral direction of FIG. 1. The circle marks in the graph each represent a change rate of the output voltage in the case in which the position of each of the piezoresistive elements 6a, 6b, 6c, and 6d is deviated from the reference position by 5 µm in the longitudinal direction of FIG. 1. The triangle marks in the graph each represent a change rate of the output voltage in the case in which the position of each of the piezoresistive elements 6a, 6b, 6c, and 6d is deviated from the reference position by 5 µm in the oblique direction of FIG. 1. The reference position of each of the piezoresistive elements 6a, 6b, 6c, and 6d is at the center in the width direction and the extending direction of the corresponding side part of the support 11.

FIG. 10 shows that the change rate of the output voltage linearly varies with respect to the width of the support 11. The change rate of the output voltage in the case in which the position of each of the piezoresistive elements 6a, 6b, 6c, and 6d is deviated in the oblique direction is the sum of the change rate of the output voltage in the case of deviation in the longitudinal direction and the change rate of the output voltage in the case of deviation in the lateral direction.

The graph shows that the width of the support 11 when the change rate of the output voltage is 0 differs between the case of deviation in the longitudinal direction and the case of deviation in the lateral direction. The piezoresistive elements 6b and 6d, which can be affected by position deviation in the lateral direction, are arranged to overlap the second side part 12b and the fourth side part 12d, respectively. The piezoresistive elements 6a and 6c, which can be affected by position deviation in the longitudinal direction, are arranged to overlap the first side part 12a and the third side part 12c, respectively. In this embodiment, the graph shows that the change rate of the output voltage is smallest under the condition that the width of each of the second side part 12b and the fourth side part 12d is 29 µm, and the width of each of the first side part 12a and the third side part 12c is 32 µm. In consideration of this, the first side part 12a, the second side part 12b, the third side part 12c, and the fourth side part 12d of the support 11 may have mutually different widths. However, the widths of two side parts that face each other are desirably equal to each other.

Next, a method of manufacturing the semiconductor pressure sensor 1 is briefly described. Herein, the semiconductor pressure sensor 1 has a square shape with each side of from approximately 1.0 mm to approximately 1.6 mm in plan view. The first diaphragm 8a has a square shape with each side of approximately 200 µm in plan view.

First, the recess 10 is formed in the main surface 3a of the second silicon substrate 3 by etching. In order to form the shapes of the inner cavity 5 and the outer cavity 7, that is, the shape of the diaphragm 8, with high accuracy, it is preferred to employ inductive coupled plasma-reactive ion etching (ICP-RIE) using the Bosch process. However, the etching method is not limited thereto, and may employ anisotropic wet etching using etchant, such as of potassium hydroxide (KOH) or tetramethylammonium hydroxide (TMAH).

The depth of the recess 10 relates to the volume of each of the inner cavity 5 and the outer cavity 7. In a case of a semiconductor pressure sensor 1 for hydrogen pressure, the internal pressure in each of the inner cavity 5 and the outer cavity 7 tends to vary due to entering of some gas such as hydrogen. Thus, from the point of view of reducing variations in the internal pressure even when gas enters, it is preferred that the volume of each of the inner cavity 5 and the outer cavity 7 be large. In consideration of this, for the semiconductor pressure sensor 1 for hydrogen pressure, the recess 10 is desirably made deep as much as possible. As the recess 10 becomes deeper, the volume of each of the inner cavity 5 and the outer cavity 7 increases. This enables suppression of variations in the internal pressure in each of the inner cavity 5 and the outer cavity 7 due to entering of hydrogen gas, resulting in reduction in variations in the sensor output.

In contrast, when the recess 10 is shallowed, it is possible to reduce a processing load in the etching step as well as suppress a decrease in mechanical strength of the second silicon substrate 3. In a case of a semiconductor pressure sensor 1 for atmospheric pressure, the internal pressure in each of the inner cavity 5 and the outer cavity 7 hardly varies even when some gas enters. In view of this, for the semiconductor pressure sensor 1 for atmospheric pressure, the recess 10 may be made shallow. Although the depth of the recess 10 at each of the inner cavity 5 and the outer cavity 7 is 50 μm in this embodiment, the depth of the recess 10 can be freely set.

Next, the silicon oxide film 4 is formed on the main surface 3a of the second silicon substrate 3 by thermal oxidation. The silicon oxide film 4 is formed also on the surfaces of the recess 10 and the support 11. In general, a silicon-on-insulator (SOI) wafer uses an oxide film having a thickness of from 0.1 μm to 1 μm at a wafer joining surface. In the case of a semiconductor pressure sensor 1 for hydrogen pressure, as the silicon oxide film 4 becomes thicker, the cross-sectional area of a path through which hydrogen gas or the like transmits increases, and it becomes easy for the gas to enter the insides of the outer cavity 7 and the inner cavity 5. In contrast, a thin silicon oxide film 4 may reduce uniformity in a joining plane irrespective of whether the semiconductor pressure sensor is for hydrogen pressure or for atmospheric pressure.

In this embodiment, the thickness of the silicon oxide film 4 is set to 0.5 μm. The thickness of the silicon oxide film 4 is not particularly limited, and the thickness of an oxide film that is used in a general SOI wafer can be used. Although the silicon oxide film 4 is formed on the main surface 3a of the second silicon substrate 3 in this embodiment, the silicon oxide film 4 may be formed on the main surface 2b of the first silicon substrate 2.

After that, the main surface 3a of the second silicon substrate 3 and the main surface 2b of the first silicon substrate 2 are joined to each other via the silicon oxide film 4 under vacuum. Thus, the inner cavity 5 and the outer cavity 7 are formed. It is preferred that the second silicon substrate 3 and the first silicon substrate 2 be joined to each other in an oxidizing atmosphere at a high temperature of approximately 1,100° C. In this case, depending on the ratio of the area of the recess 10 to the area of the whole wafer, the temperature in the oxidizing atmosphere may be increased to approximately 1,200° C. for the purpose of improving bonding strength.

A part of the first silicon substrate 2 becomes the diaphragm 8. Thus, after the second silicon substrate 3 and the first silicon substrate 2 are joined to each other, the thickness of the first silicon substrate 2 is adjusted in accordance with the pressure range of a measurement target. Specifically, the thickness of the first silicon substrate 2 is adjusted by grinding and polishing the whole main surface 2a of the first silicon substrate 2. In this manner, the diaphragm 8 is adjusted so as to have an appropriate thickness in accordance with the pressure range of the measurement target.

Next, the piezoresistive elements 6a, 6b, 6c, and 6d are formed on the main surface 2a of the first silicon substrate 2. Each of the piezoresistive elements 6a, 6b, 6c, and 6d is formed at an outer edge part of the first diaphragm 8a, that is, a region joined to the support 11 of the diaphragm 8. Each of the piezoresistive elements 6a, 6b, 6c, and 6d is formed by implanting impurity ions such as of boron, subsequent heat treatment, and the like. Moreover, a diffusion wiring layer is formed by ion implantation and subsequent heat treatment. Then, a metal wiring layer and a metal electrode pad are formed by depositing metal films, such as of Al, Al—Si, or Al—Si—Cu, with the use of sputtering, electron beam evaporation, or other method.

With the steps described above, a plurality of semiconductor pressure sensors 1 are formed at a time on a wafer. After that, the semiconductor pressure sensors 1 are cut off from each other in a dicing step.

Figure 11:
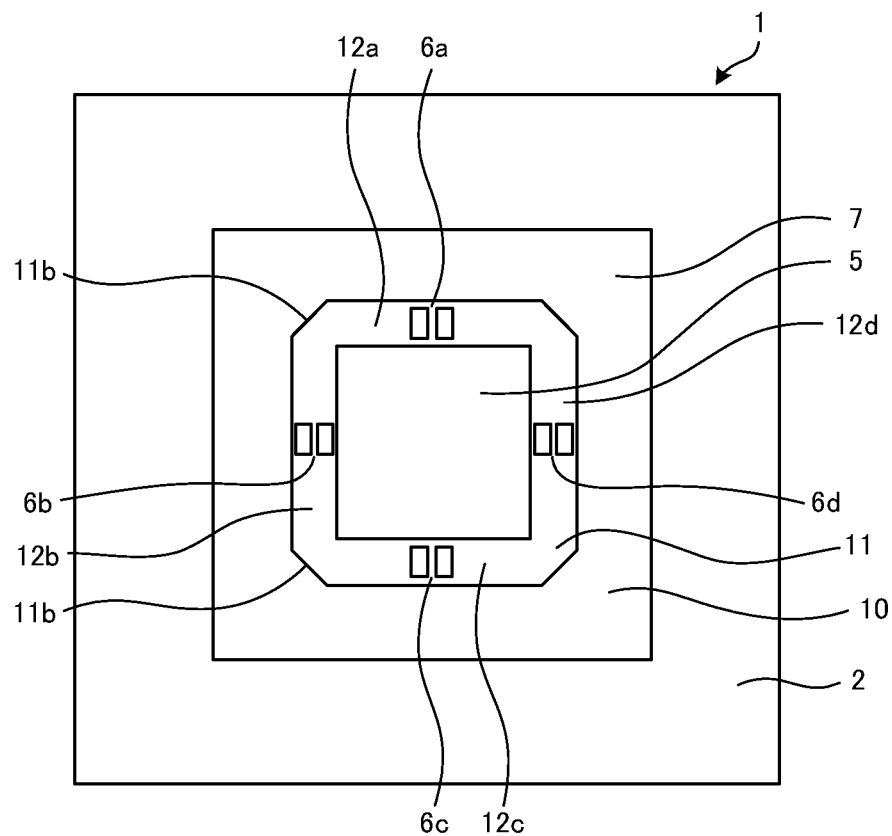
FIG. 11 is a plan view for illustrating a configuration of a semiconductor pressure sensor according to Modification Example 1 of the first embodiment.

Next, modification examples of this embodiment are described. FIG. 11 is a plan view for illustrating a configuration of a semiconductor pressure sensor according to Modification Example 1 of this embodiment. As illustrated in FIG. 11, the support 11 includes four corners as seen from the normal direction of the first silicon substrate 2. Each of the four corners has a chamfered part 11b formed therein. The chamfered part 11b is formed along the whole height direction of the support 11. The chamfered part 11b faces the outer cavity 7. The chamfered part 11b is sufficiently separated from each of the piezoresistive elements 6a, 6b, 6c, and 6d. The chamfered part 11b is formed by chamfering the corner at 45 degrees. The chamfered part 11b may be formed by rounding the corner.

In the rectangular frame-shaped support 11, strain is most concentrated on the corners. In Modification Example 1, the chamfered parts 11b, which are formed at the corners, suppress damage to the corners due to concentration of strain. In addition, the plane shape of the support 11 is formed into an octagonal shape or a rounded corner rectangular shape while the width of each of the side parts 12a, 12b, 12c, and 12d is maintained. Thus, mechanical strength of the support 11 can be improved.

Figure 12:
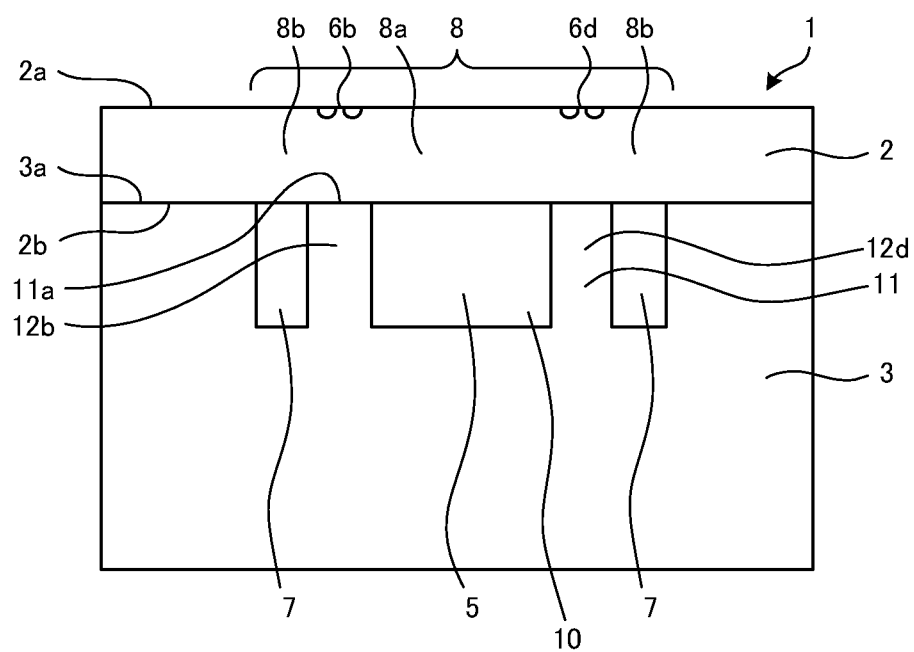
FIG. 12 is a schematic view for illustrating a cross-sectional configuration of a semiconductor pressure sensor according to Modification Example 2 of the first embodiment.

FIG. 12 is a schematic view for illustrating a cross-sectional configuration of a semiconductor pressure sensor according to Modification Example 2 of this embodiment. As illustrated in FIG. 12, the main surface 2b of the first silicon substrate 2 and the main surface 3a of the second silicon substrate 3 are directly joined to each other without using a silicon oxide film. The main surface 2b of the first silicon substrate 2 and the protrusion end surface 11a of the support 11 are also directly joined to each other without using a silicon oxide film. Each of the joining surfaces of the first silicon substrate 2 and the second silicon substrate 3 is formed only of silicon. With this configuration, mechanical strength of the semiconductor pressure sensor 1 can be enhanced. In addition, joining is performed between silicon and silicon, instead of between silicon and silicon oxide, and hence effects of internal stress due to joining of different types of materials are reduced. Thus, in Modification Example 2, it possible to enhance robustness with respect to thermal expansion.

The pressure in each of the inner cavity 5 and the outer cavity 7 may vary with time in some cases. Variation in pressure in each cavity causes variations in the degree of strain that is generated in the diaphragm in response to pressure of a measurement target. In consideration of this, the inner cavity 5 and the outer cavity 7 may spatially communicate with each other via an opening.

Figure 13:
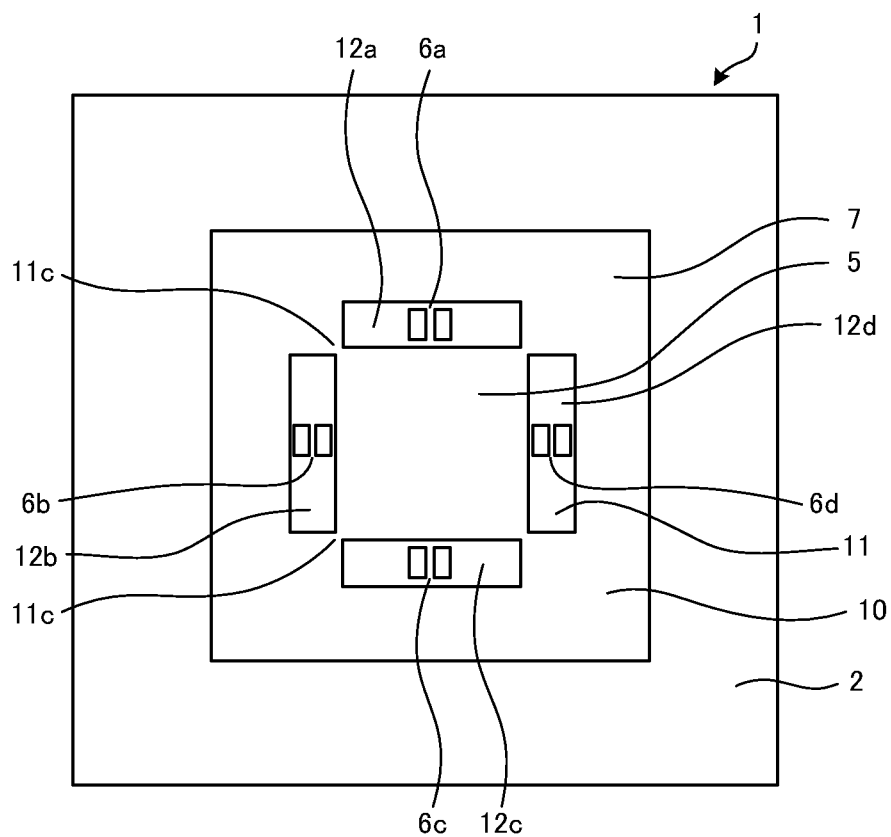
FIG. 13 is a plan view for illustrating a configuration of a semiconductor pressure sensor according to Modification Example 3 of the first embodiment.

FIG. 13 is a plan view for illustrating a configuration of a semiconductor pressure sensor according to Modification Example 3 of this embodiment. As illustrated in FIG. 13, each of four corners of the support 11 has an opening 11c formed therein. The inner cavity 5 and the outer cavity 7 spatially communicate with each other via the opening 11c. The opening 11c is sufficiently separated from each of the piezoresistive elements 6a, 6b, 6c, and 6d. As long as the width of the support 11 is maintained, the opening area of the opening 11c can be freely set. With the inner cavity 5 and the outer cavity 7 spatially communicating with each other, the pressure in the inner cavity 5 and the pressure in the outer cavity 7 are maintained at the same level. Thus, it is possible to suppress variation with time of the respective pressures in the inner cavity 5 and the outer cavity 7.

As described above, the semiconductor pressure sensor 1 according to this embodiment includes the first silicon substrate 2 and the second silicon substrate 3. One main surface 2b of the first silicon substrate 2 and one main surface 3a of the second silicon substrate 3 are joined to each other. The main surface 3a of the second silicon substrate 3 has the recess 10 formed therein. The first silicon substrate 2 includes the diaphragm 8 that faces the recess 10. The recess 10 has the support 11 that protrudes toward the first silicon substrate 2 formed therein. The support 11 includes the four side parts 12a, 12b, 12c, and 12d that are arranged to form a rectangular frame shape. The protrusion end surface 11a of the support 11 is joined to the main surface 2b of the first silicon substrate 2. The inner cavity 5, which is arranged on the inner side of the support 11, and the outer cavity 7, which is arranged on the outer side of the support 11, are formed between the recess 10 and the first silicon substrate 2. The other main surface 2a of the first silicon substrate 2 has the piezoresistive elements 6a, 6b, 6c, and 6d formed therein. The piezoresistive elements 6a, 6b, 6c, and 6d are arranged at or in the vicinity of the position overlapping the support 11, as seen from the normal direction of the first silicon substrate 2.

With this configuration, a uniform strain is generated in the diaphragm 8 in the vicinity of the region joined to the support 11. Thus, it is possible to reduce variations in the output voltage relative to pressure even when the positions of the piezoresistive elements 6a, 6b, 6c, and 6d are deviated.

Herein, the vicinity of the position overlapping the support 11 is an area of 10 μm or less in distance from the position overlapping the support 11. The exposure process in each of the step of forming the piezoresistive elements 6a, 6b, 6c, and 6d and the step of forming the recess 10 can cause misalignment of from approximately 2 μm to approximately 3 μm. As a result, position deviation of from approximately 4 μm to approximately 6 μm at the maximum can occur between each of the piezoresistive elements and the support 11. The width of the support 11 may be 20 μm, and the width in the width direction of the support 11 of the piezoresistive element may be 26 μm. In this case, the piezoresistive element protrudes from each side in the width direction of the support 11 by 3 μm, even when the position of the center in the width direction of the support 11 and the position of the center of the piezoresistive element match each other. Addition of the width of the position deviation between the piezoresistive element and the support 11 of from approximately 4 μm to approximately 6 μm and the protruded width of the piezoresistive element from the support 11 of 3 μm results in a width of from approximately 7 μm to approximately 9 μm. That is, the piezoresistive element in this embodiment can be present not only at the position overlapping the support 11 but also at a position separated from the position overlapping the support 11 by approximately 10 μm.

In the semiconductor pressure sensor 1 according to this embodiment, in the strain distribution of the diaphragm 8 in the width direction of one of the four side parts 12a, 12b, 12c, and 12d, the peak of strain that is generated in a region on the inner side of the center in the width direction of the side part and the peak of strain that is generated in a region on the outer side of the center in the width direction of the side part are equal to each other. With this configuration, a more uniform strain is generated in the diaphragm 8 in the vicinity of the region joined to the support 11. Thus, it is possible to reduce variations in the output voltage relative to pressure even when the positions of the piezoresistive elements 6a, 6b, 6c, and 6d are deviated.

In the semiconductor pressure sensor 1 according to this embodiment, in the strain distribution of the diaphragm 8 in the width direction of one of the four side parts 12a, 12b, 12c, and 12d, the relative strain is 0.8 or higher at the center in the width direction of the side part, assuming that a maximum strain amount is 1. With this configuration, a more uniform strain is generated in the diaphragm 8 in the vicinity of the region joined to the support 11. Thus, it is possible to reduce variations in the output voltage relative to pressure even when the positions of the piezoresistive elements 6a, 6b, 6c, and 6d are deviated.

In the semiconductor pressure sensor 1 according to this embodiment, in the strain distribution of the diaphragm 8 in the width direction of one of the four side parts 12a, 12b, 12c, and 12d, the degree of strain that is generated in a region overlapping the side part as seen from the normal direction of the first silicon substrate 2 is uniform in the width direction of the side part. With this configuration, it possible to reduce variations in the output voltage relative to pressure even when the positions of the piezoresistive elements 6a, 6b, 6c, and 6d are deviated.

In the semiconductor pressure sensor 1 according to this embodiment, two side parts that face each other among the four side parts 12a, 12b, 12c, and 12d may have the same width.

In the semiconductor pressure sensor 1 according to this embodiment, the piezoresistive elements include the two piezoresistive elements 6b and 6d that face each other. The distance D1 between the centers of the two piezoresistive elements 6b and 6d is equal to the distance ((D2+D3)/2) between the centers in the width direction of the two side parts 12b and 12d that face each other among the four side parts. With this configuration, it possible to reduce variations in the output voltage relative to pressure even when the positions of the piezoresistive elements 6a, 6b, 6c, and 6d are deviated.

In the semiconductor pressure sensor 1 according to this embodiment, each of the plurality of piezoresistive elements 6a, 6b, 6c, and 6d may be arranged at the position overlapping the support 11, as seen from the normal direction of the first silicon substrate 2.

In the semiconductor pressure sensor 1 according to this embodiment, the width of each of the four side parts 12a, 12b, 12c, and 12d is equal to or greater than the sum of the dimension of the corresponding piezoresistive element 6a, 6b, 6c, or 6d and a positional tolerance of the corresponding piezoresistive element 6a, 6b, 6c, or 6d. With this configuration, it possible to form each of the piezoresistive elements 6a, 6b, 6c, and 6d in the region overlapping the support 11 even when the positions of the piezoresistive elements 6a, 6b, 6c, and 6d are deviated.

In the semiconductor pressure sensor 1 according to this embodiment, the corners of the support 11 has the chamfered parts 11b formed therein. With this configuration, it is possible to suppress damage to the corners of the support 11 due to concentration of strain, and to improve mechanical strength of the support 11.

In the semiconductor pressure sensor 1 according to this embodiment, the inner cavity 5 and the outer cavity 7 spatially communicate with each other. With this configuration, the pressures in the inner cavity 5 and the outer cavity 7 are maintained at the same level, and hence it is possible to suppress variation with time of the respective pressures in the inner cavity 5 and the outer cavity 7.

In the semiconductor pressure sensor 1 according to this embodiment, the protrusion end surface 11a is directly joined to the main surface 2b of the first silicon substrate 2. With this configuration, it is possible to increase mechanical strength of the semiconductor pressure sensor 1, and to enhance robustness with respect to thermal expansion.

What is claimed is:

1. A semiconductor pressure sensor, comprising:
   a first silicon substrate; and
   a second silicon substrate,
   one main surface of the first silicon substrate and one main surface of the second silicon substrate being joined to each other,
   the one main surface of the second silicon substrate having a recess formed therein,
   the first silicon substrate including a diaphragm that faces the recess,
   the recess having a support that protrudes toward the first silicon substrate formed therein,
   the support including four side parts that are arranged to form a rectangular frame shape,
   the support including a protrusion end surface that is joined to the one main surface of the first silicon substrate,
   the recess and the first silicon substrate having an inner cavity and an outer cavity that are formed therebetween, the inner cavity being arranged on an inner side of the support, the outer cavity being arranged on an outer side of the support,
   the other main surface of the first silicon substrate having piezoresistive elements formed therein,
   the piezoresistive elements being arranged at a position overlapping the support, as seen from a normal direction of the first silicon substrate.

2. The semiconductor pressure sensor according to claim 1, wherein, in a strain distribution of the diaphragm in a width direction of one of the four side parts, a peak of strain that is generated in a region on an inner side of a center in the width direction of the one of the four side parts and a peak of strain that is generated in a region on an outer side of the center in the width direction of the one of the four side parts are equal to each other.

3. The semiconductor pressure sensor according to claim 1, wherein, in a strain distribution of the diaphragm in a width direction of one of the four side parts, a relative strain is 0.8 or higher at a center in the width direction of the one of the four side parts, assuming that a maximum strain amount is 1.

4. The semiconductor pressure sensor according to claim 1, wherein, in a strain distribution of the diaphragm in a width direction of one of the four side parts, a degree of strain that is generated in a region overlapping the one of the four one side parts as seen from the normal direction of the first silicon substrate is substantially uniform in the width direction.

5. The semiconductor pressure sensor according to claim 1, wherein two side parts that face each other among the four side parts have the same width.

6. The semiconductor pressure sensor according to claim 1, wherein a width of each of the four side parts is equal to or greater than a sum of a dimension of a corresponding piezoresistive element among the piezoresistive elements and a positional tolerance of the corresponding piezoresistive element.

7. The semiconductor pressure sensor according to claim 1,
   wherein the piezoresistive elements include two piezoresistive elements that face each other, and
   wherein a distance between centers of the two piezoresistive elements is equal to a distance between centers in a width direction of two side parts that face each other among the four side parts.

8. The semiconductor pressure sensor according to claim 7, wherein the support has a corner that has a chamfered part formed therein.

9. The semiconductor pressure sensor according to claim 7, wherein the inner cavity and the outer cavity spatially communicate with each other.

10. The semiconductor pressure sensor according to claim 7, wherein the protrusion end surface is directly joined to the one main surface of the first silicon substrate.

* * * * *